United States Patent [19]

Bakoledis

[11] 3,944,067

[45] Mar. 16, 1976

[54] AUTOMATIC FASTENER FEED MAGAZINE AND FEED BELT

[75] Inventor: Andrew G. Bakoledis, Clinton, Conn.

[73] Assignee: Olin Corporation, New Haven, Conn.

[22] Filed: Nov. 21, 1974

[21] Appl. No.: 525,688

Related U.S. Application Data

[62] Division of Ser. No. 408,341, Oct. 23, 1973, Pat. No. 3,863,824.

[52] U.S. Cl. ................................................ 206/347
[51] Int. Cl.² ........................................ B65D 85/24
[58] Field of Search ........... 206/347, 346, 345, 343, 206/338

[56] References Cited
UNITED STATES PATENTS 3,211,284   10/1965   Anstett ........................... 206/347 X
3,632,032   1/1972   Termet ........................... 206/345 X Primary Examiner—Leonard Summer
Attorney, Agent, or Firm—Donald R. Motsko; H. Samuel Kieser; William W. Jones

[57] ABSTRACT

A belt for holding a plurality of fasteners including a plurality of fastener receiving sleeves interconnected by webs. Each sleeve has a generally triangularly-shaped internal cross-sectional configuration. The corners of the internal triangle may be cut off to form flat surfaces. The fastener is engaged by the three sides of the triangle. The external surface of each adjacent sleeve has a planar portion positioned above and below the web which tapers away from said web. In addition, one end of each of the sleeves has a circular counter-bore therein and the other end has a groove therein extending parallel to the length of the belt. Each of the webs between adjacent sleeves has a V-shaped groove therein.

3 Claims, 14 Drawing Figures

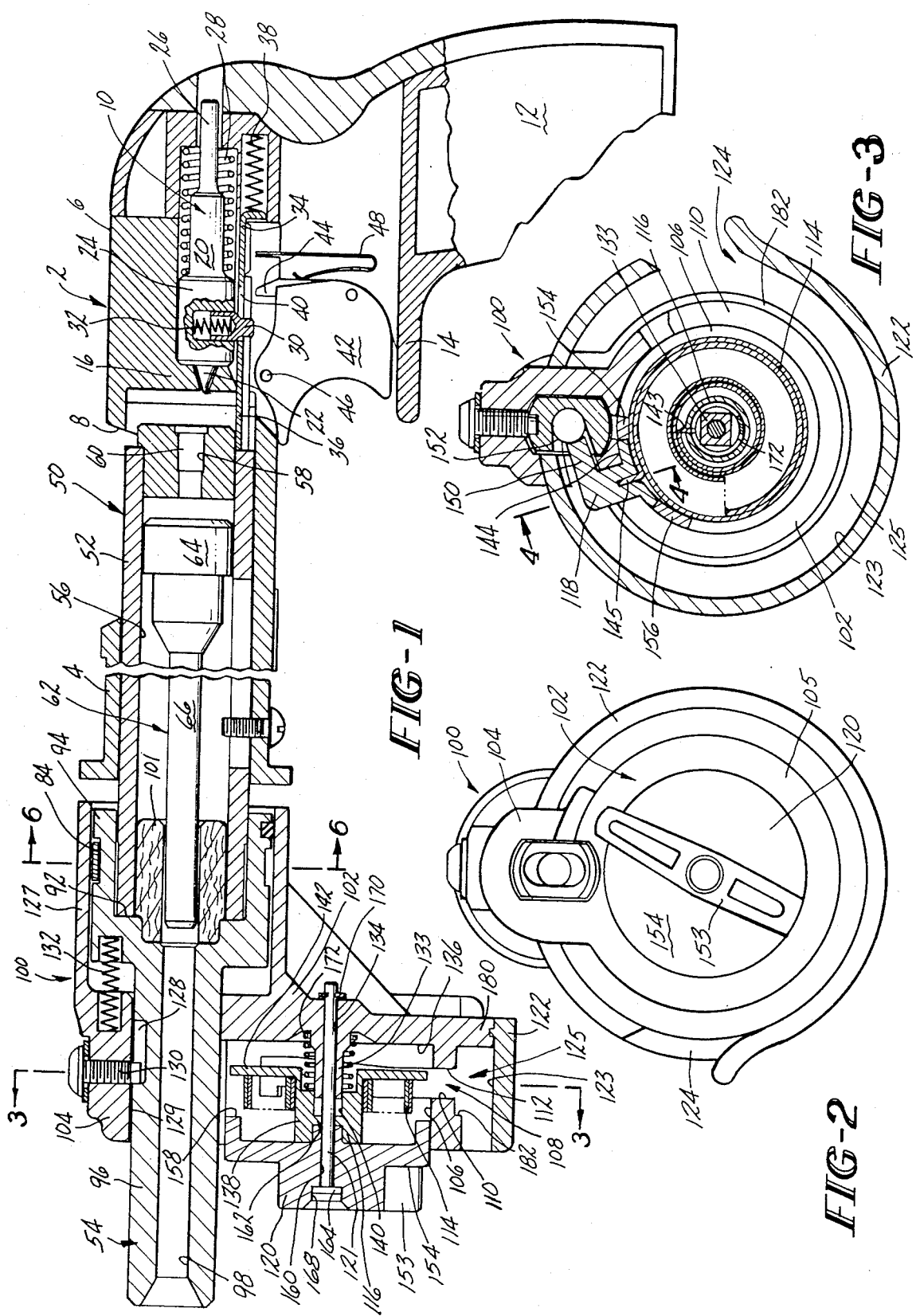

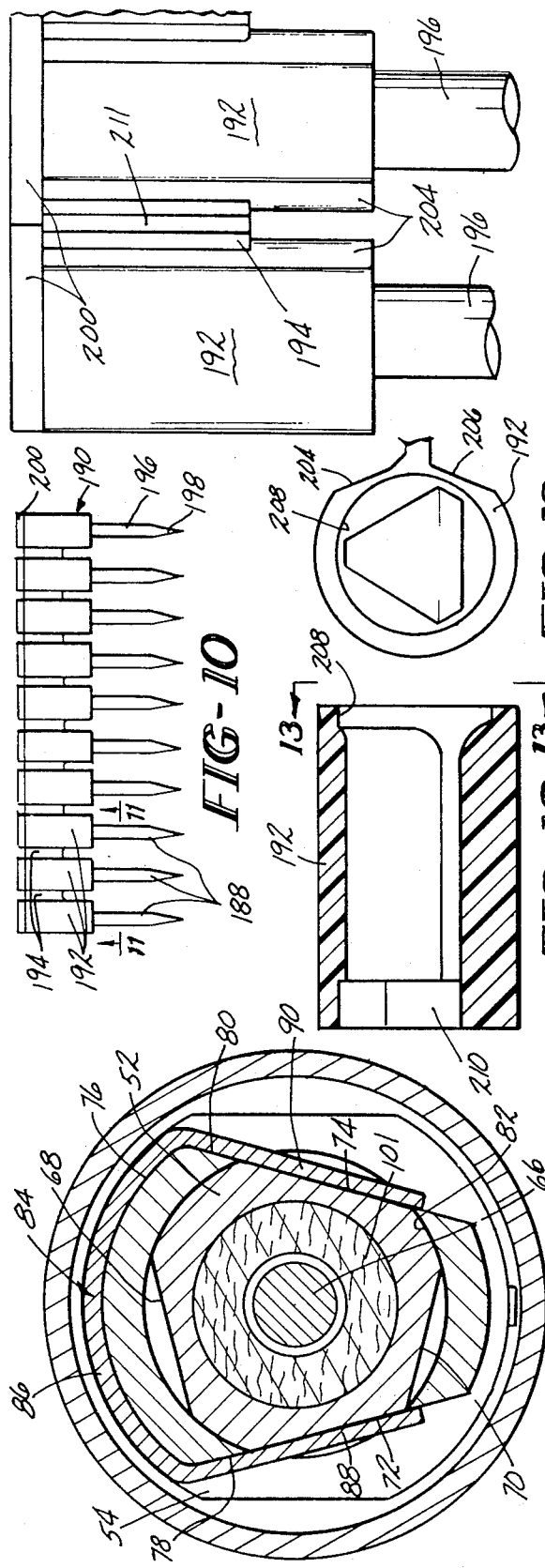

AUTOMATIC FASTENER FEED MAGAZINE AND FEED BELT

This is a division, of application Ser. No. 408,341, filed Oct. 23, 1973, now U.S. Pat. No. 3,863,824, issued Feb. 4, 1975.

This invention relates generally to the field of power-actuated fastening tools of the type adapted to drive fasteners such as pins, bolts studs, etc. into concrete, steel, wood, masonry or the like.

More particularly this invention relates to an automatic fastener feed magazine for such tools and also to a feed belt for holding a number of fasteners together for feeding.

Power-actuated tools for driving fasteners, especially those of the type which utilize a powder charge for driving a piston which drives the fastener, are widely used in the construction industry for many purposes. The speed with which a tool can be loaded, both with fasteners and powder charges, is important as the faster a tool can be loaded, the faster a series of fastening operations can be done, resulting in less cost for the fastening job.

The present invention has for its object, the provision of a fastener feed magazine which will hold a plurality of fasteners and feed them into a power-actuated tool after each fastening operation.

Another object of this invention is the provision of a fastener feed magazine which will hold a plurality of fasteners and automatically feed them into a fastening tool in a position to be fed after the previous fastening operation.

A further object of this invention is the provision of a fastener feed belt for holding fasteners together for feeding into a fastening tool.

A more specific object of the present invention is to provide a fastener feed belt for holding fasteners together which will permit the fasteners to be easily stripped from the belt and which won't interfer with the fastening operation.

These and other objects and advantages of this invention will become more apparent by reference to the following description of a preferred embodiment of the invention and to the accompanying drawings in which:

FIG. 1 is a transverse sectional view of a tool incorporating the present invention and showing the components of the tool in a position wherein movement of the housing in a forward direction relative to the barrel assembly will cock the firing mechanism;

FIG. 2 is an elevational view of the muzzle end of the tool;

FIG. 3 is a transverse sectional view taken along the lines of 3—3 of FIG. 1;

FIG. 6 is a transverse sectional view taken along the lines 6—6 of FIG. 1;

FIG. 7 is an elevational view of the forward or muzzle end of the barrel of the tool of FIG. 1;

FIG. 8 is a side elevational view of the barrel taken in the direction indicated by the arrows in FIG. 7;

FIG. 10 is a partially schematic diagram of a plurality of fasteners held together by a belt of the type used in connection with the tool of FIG. 1;

FIG. 11 is an enlarged sectional view taken along the lines 11—11 of FIG. 10;

FIG. 12 is a transverse sectional view taken along the lines 12—12 of FIG. 11, but with the fastener omitted;

FIG. 13 is an end view of one segment of the belt taken in the direction indicated by the arrows 13—13 of FIG. 12; and FIG. 14 is a top plan view of the belt and fastener taken in the direction of the arrows 14—14 of FIG. 12.

Figure 9:
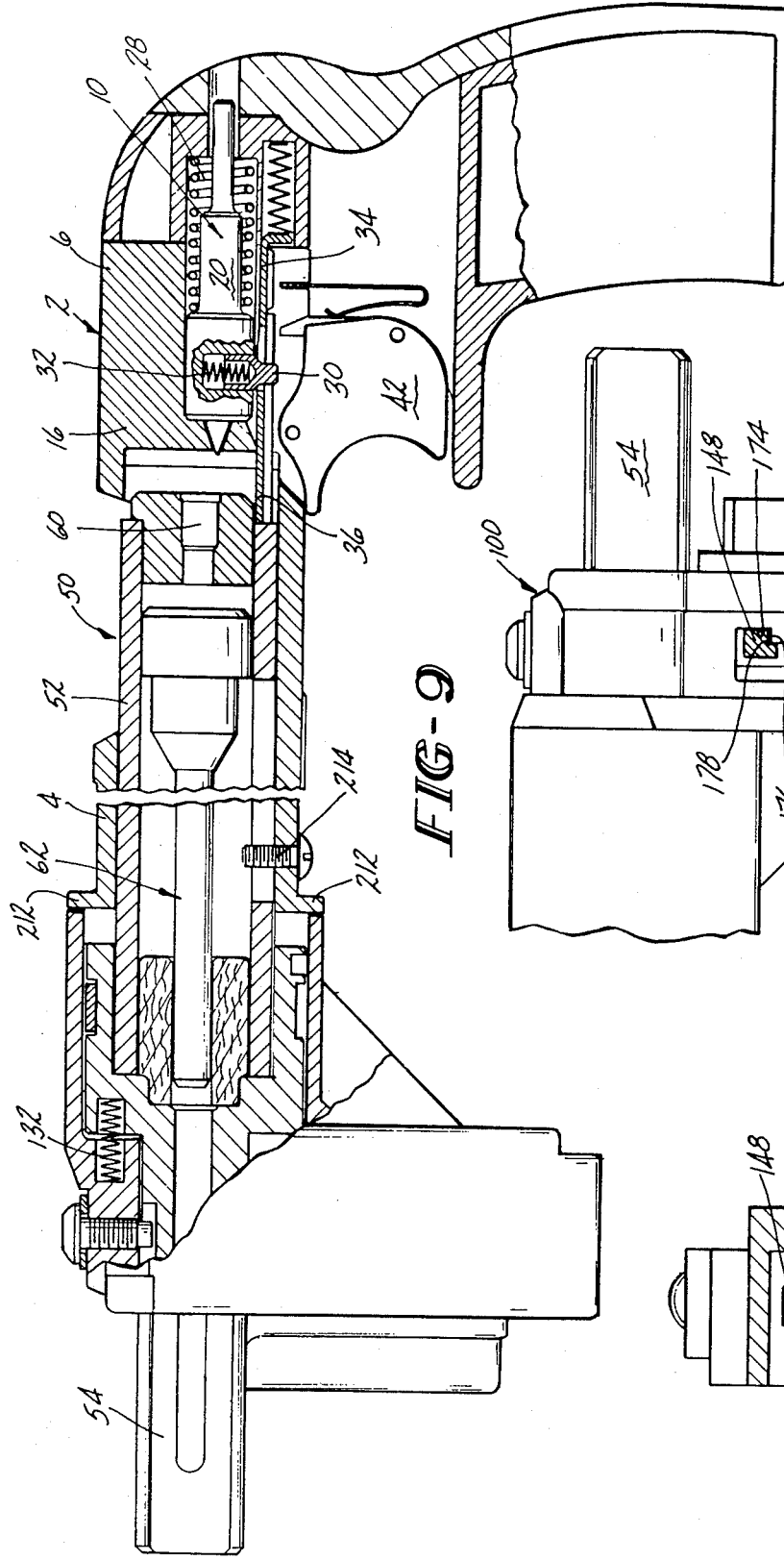
FIG. 9 is a partial sectional view of the tool of FIG. 1, showing the automatic feed magazine of the tool in its rearward most position relative to the remainder of the tool.

Referring more specifically to the drawings, FIG. 1 shows a tool which may be used with the present invention. The tool includes a housing 2 having a tubular forward portion 4 and a rearward portion 6. The tubular forward portion 4 includes an elongated opening 8 to provide access for loading and unloading an explosive charge. The rearward position 6 of the housing 2 houses the firing mechanism 10 and also includes a pistol grip 12 and a trigger guard 14.

The firing mechanism 10 includes a breech block 16 having a frusto-conical opening 18 therein. A firing pin 20 is mounted behind the breech block 16 for axial movement in the housing 2 and includes a frusto-conical nose portion 22, a body portion 24 and a rearwardly extending rod portion 26. The firing pin 20 is urged forwardly by a suitable spring member 28. A detent member 30 extends radially downwardly from the body portion 24 of the firing pin 20. The detent member 30 is spring biased outwardly by suitable spring means 32.

A cocking rod 34 is mounted for reciprocation in the rearward portion 6 of the housing 2 and includes a forward portion 36 extending through the breech block 16 and into the tubular forward portion 4 of the housing 2. The cocking rod 34 may be spring biased forwardly by a suitable spring member 38. The cocking rod may also include an elongated opening 40 through which the detent member 30 on the firing pin 20 may extend.

A trigger member 42 having a sear portion 44 may be pivotally mounted above the trigger guard 14 by a pivot pin 46. The trigger is resiliently urged away from the firing position by spring member 48.

A barrel assembly 50 is reciprocally mounted within the tubular portion 4 of the housing 2 and extends from the muzzle end thereof. The barrel assembly includes a barrel member 52 and a muzzle bushing 54 attached thereto at its forward end in a manner to be explained in greater detail below. The barrel member 52 has a bore 56 therein and is provided with a cartridge receiving chamber 58 at its breech end for the reception of an explosive charge 60.

A piston member 62 may be mounted for reciprocal movement within the barrel assembly 50. The piston member 62 includes a generally cylindrical head portion 64 and a reduced elongated cylindrical shank portion 66.

The muzzle bushing is attached to the barrel member 52 by the means shown most clearly in FIGS. 1 and 6–8. At forward end of the barrel member 52, the side wall is provided with a first set of two lands 68 and 70 that are spaced on opposite sides of the vertical midplane of the barrel member 52. Each of the lands 68 and 70 lies in a plane that intersects the other at a line which lies in a vertical plane passing through the axis of the barrel member 52. At a point rearward of the forward end of the barrel member 52 as shown in FIG. 8, are a second set of lands 72 and 74. The second set of lands 72 and 74 are circumferentially spaced about the axis of the barrel member 90° from the first set as shown in FIG. 7. It can thus be seen that a shoulder 75 is formed forward of each of the second set of lands 72 and 74. It is to be noted that the first set of lands 68 and 70 terminate at their rearward end in the same vertical plane as does lands 72 and 74.

The sidewall of the muzzle bushing 54, at a point spaced from the rearward end thereof, is provided with a circumferential groove 76 which is intersected by two planar cutout portions 78 and 80, each of which intersects the bore 82 in the rearward enlarged portion 82 of the muzzle bushing 54. An inverted U-shaped tension spring 84 has a portion 86 positioned in the groove 76 with its legs 88 and 90 bent toward each other and positioned in the cutouts 72 and 74 respectively.

Assuming the muzzle bushing 54 is to be attached to the barrel member 52, the muzzle bushing 54 is positioned 90° clockwise from its position shown in FIG. 6 so that the legs 88 and 90 of the spring member 84 positioned in the cutout portions 78 and 80 are in alignment with the lands 68 and 70 of the barrel member 52. The muzzle bushing 54 may then be telescoped over the end of the barrel member 52 until the barrel member 52 abuts a shoulder 92 in the muzzle bushing 52. The muzzle bushing 52 may then be rotated 90° counter-clockwise as viewed in the direction of FIG. 6 so that the legs 88 and 89 of the spring 84 abut the lands 72 and 74. The shoulders 75 prevent the muzzle bushing 54 from forward axial movement relative to the barrel member 52. The resilience of the legs of the spring permits the legs to flex outwardly as the muzzle bushing 52 is rotated until the legs of the spring 84 snap back against the lands 72 and 74 in the barrel member 52. This in effect forms a detent which resiliently prevents the muzzle bushing 54 from rotating with respect to the barrel member 52.

The muzzle bushing 54 is generally elongated with an enlarged head portion 94 in which the shoulder 92 is provided and a forwardly extending reduced portion 96 having a fastener receiving bore 98 therein. A buffer member 101 of a suitable material such as polyethylene or the like is positioned with an enlarged head portion 92 of the muzzle bushing 54 within the barrel member 52 as shown in FIG. 1 to absorb the energy of the piston member 62 in event of its overdrive.

A magazine assembly 100 is attached to the forward end of the tool and including a magazine housing 102 having a generally tubular upper portion 104 that is telescoped over a portion of the muzzle bushing 54 and the forward end of the barrel member 52.

The lower portion 105 of the magazine housing 102 is generally cylindrical with a bore 106 extending axially inwardly from the forward end thereof. A follower cam track 108 is cut into the side wall of the lower portion and is defined by two spaced apart surfaces 110 and 112. A spring 114 and a spring holder 116 are located within the bore 106. A follower member 118 attached to the spring 114 is adapted to ride in the follower cam track 108. A follower rotator 120 is rotatably attached by a pin 121 to the lower portion of the magazine housing 102 and moves the follower member 118 in cam track 108. An arcuate cover member 122 having an opening 124 for the insertion of a fastener belt is also attached to the lower portion and has its side wall 123 spaced from the sidewall of the lower portion to provide a space 125 in which a fastener belt is contained.

More specifically, the upper portion 104 of the magazine housing 102 includes a rearward hollow cylindrical portion 127 and a reduced forward portion 126 having a bore 129 therethrough. The rearward hollow cylindrical portion 127 is generally positioned about the enlarged portion of the muzzle bushing 52 with the reduced portion of the muzzle bushing 54 extending through the bore 129. The bore 129 has the general configuration as the outer surface of the reduced portion of the muzzle bushing 54 which is generally rectangular with the upper and lower surfaces slightly arcuate. The upper surface of the reduced muzzle portion of the muzzle bushing 54 has an axially elongated slot 128 therein in which is received the end of a screw member 130 attached to the magazine housing 102 providing for limited axial movement between the housing 102 and muzzle bushing 54 while preventing relative rotation therebetween. A spring member 132 between the muzzle bushing 54 and magazine housing 102 biases the housing 102 into its forward position relative to the muzzle bushing 54.

A square post 133 having a bore 134 therethrough extends from the back inner face 136 into the bore 106 of the lower portion 105 of the magazine housing 102. The spring holder 116 includes a hub 138 mounted on the post 133 with the post 133 being received within a square bore 140 therein whereby the spring holder 116 is prevented from relative rotation with respect to the magazine housing 102 but can move in a direction along the axis of the bore. The spring holder 116 also includes a circular disc 142 at the rearward end of the hub 138. The spring member 114 is a metallic band spring coiled about the hub 138 of the spring holder 116 with its inner end portion 143 attached to the hub and its outer end portion 145 attached to the follower member 118. A view in FIG. 3, starting from the hub 138, the spring 114 is coiled counter-clockwise thereby placing a bias on the follower member 118 which tends to move it clockwise as viewed in FIG. 3.

The follower member 118 has an arcuate base plate 144 which tends to ride on the spring 114 with a side portion reduced to form a shoulder 146 which abuts against the outer edge of the disc 142 of the spring holder 116. A post 148 attached to the base plate 144 rides in and extends through the follower cam track 108. The base plate 144 is wider than the cam track 108 thereby limiting the movement of the follower member in a radially outwardly direction with respect to the magazine housing 102. A fastener belt engaging portion 150, attached to the post 148, extends in the space 125 between the magazine housing 102 and cover member 122 to engage the end of a belt of fasteners to urge the fasteners through an opening 152 in the side of the muzzle bushing 54 into the bore 98 therein.

The follower rotator 120 is generally cup-shaped of a diameter to fit within the bore 106 of the magazine housing 102. A grip 153 is provided on the outside of the bore 154 of the follower rotator 120 to provide means for rotating it. Two spaced apart legs 154 and 156 extend axially rearwardly in the housing 102 from the side wall 158 of the follower rotator 120 and are spaced on either side of the base plate 144 of the follower member 118 whereby the follower member 118 and follower rotator will rotate together.

The pin 121 extends through a bore 160 in the follower rotator 120, a bore 162 in the spring holder 116, and the bore 134 in the post 133 of the magazine housing 102. The head 164 of the pin 121 is received within a counter bore 168 in the grip 153 of the follower rotator 120 while the other end of the pin extends through the magazine holder 102 and has a snap ring 170 attached thereto to retain the various components. A spring member 172 is provided between the back inner face 136 of the magazine housing 102 and the spring holder 116 to bias the spring holder 120, and therefore, the follower member 118, and therefore, the follower member 118, and follower rotator 120 forwardly, or to the left as viewed in FIG. 1. The snap ring 170 limits the forward movement of these parts.

Figure 5:
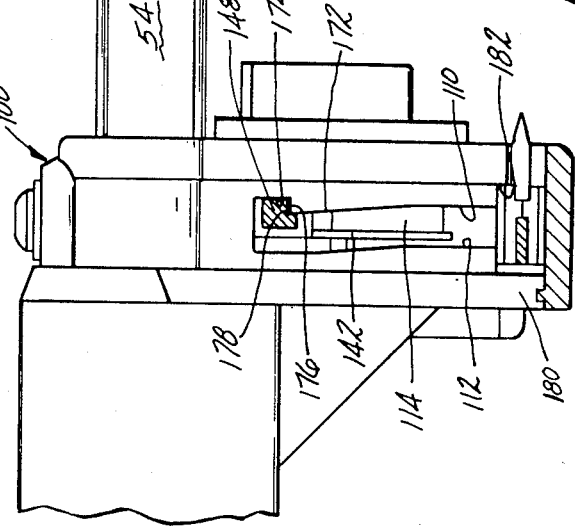
FIG. 5 is a side elevational view of the forward portion of the tool, partially in section, looking in the direction indicated by the arrows 5—5 in FIG. 2.
Figure 4:
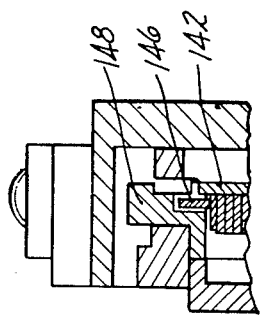
FIG. 4 is a partial sectional view taken along the lines 4—4 of FIG. 3.

The cam track 108 is so shaped that it serves to lock the follower member 118 in the loading position, which, as viewed in FIG. 3 is the position when the follower member 118 has been rotated counter-clockwise. As can be seen in FIG. 5, the cam track 108 has a portion 173, the center line of which moves rearwardly as rotation is continued around the periphery of the magazine housing 102 in a counter-clockwise direction as viewed in FIG. 3. At the end of portion 173, there is a forwardly extending portion 174 forming a shoulder 176. The post 148 of the follower member 118 is provided with a shoulder 178 to engage the shoulder 176 formed in the cam track 108 and hold the follower member 118 in the loading position.

The rearward portion of the lower portion 105 of the magazine housing 100 has a radially extending flange 180 thereon. A shoulder 182 is provided in the side wall of the magazine housing at a point spaced forwardly of the flange 180 a predetermined distance which is substantially equal to the width of a fastener belt and head portion of a fastener. The cover member 122 is generally cylindrical in shape and has its inner wall 123 spaced from the side wall of the lower portion of the magazine 102 a distance substantially equal to the thickness of the belt holding fasteners.

As shown in FIGS. 10–14, the fasteners 188 are held together in a group of suitable numbers by a feed belt 190. The feed belt 190 comprises a series of fastener holding guide sleeves 192 connected by webs 194. The fasteners 188 include a shank portion 196, a tapered tip portion 198, and an enlarged head portion 200. The internal configuration of the sleeves 192 is generally triangular to provide minimum surface contact with the shank portion 196 of the fasteners and to create thin wall sections at three corners. Each corner is slightly reduced providing flat surfaces at the corner as indicated at 202. The outer surface of each adjacent sleeve 192 has upper and lower straight portions 204 and 206 which taper away from the web as shown in FIG. 11 to allow the belt to flex. The rearward end of each sleeve 192 has a circular counterbore 208 therein to enable the fastener to be properly inserted. The forward end of each sleeve has a slot 210 running across its face to allow the belt 190 to be oriented in a fastener assembly machine and also to aid in allowing the sleeves 192 to break away from the fastener when being driven into a work surface. The webs 194 have a V-shaped groove 211 in their upward surface to aid in the separation of a fastener 188 and guide sleeve 192 from an adjacent one when impacted by the piston.

To load the fastener belt, the follower rotator 120 is rotated clockwise as viewed in FIG. 2 thereby rotating the follower member 118 in the cam track 108 counterclockwise as viewed in FIG. 3. As the follower member 118 reaches portion 173 of the cam track, the follower member 118 moves axially rearwardly relative to the magazine housing 102 depressing the spring 172 by virtue of its engagement with the shoulder 146 being in engagement with the disc 142 of the spring holder 116. When the post 148 of the follower member 118 passes portion 174 of the cam track 108, the spring 172 will urge the spring holder 116 and, therefore, the follower member 118 forwardly so that the shoulder 178 of the follower member 118 engages the shoulder 176 of the cam track 108 and is held in the loading position. A feed belt 190 can then be inserted through the opening 124 in the cover member 122 with the tip portion of the fasteners 188 facing forwardly. The belt 190 is inserted in the space 124 between the magazine housing 100 and cover member 122 with the head portion 200 of the fastener guided by the flange 180 on the magazine housing 102 and the forward edges of the sleeves 192 guided by the shoulder 182 in the side wall of the magazine housing 102.

After a fastener belt 190 has been inserted into the magazine assembly 100, the follower member 118 can be released from its loading position by depressing the follower rotator 120 which depresses the follower member 118 rearwardly so its shoulder 178 disengages from the shoulder 176 of the cam track 108. The spring 114 causes the follower to rotate so that the fastener belt engaging portion 150 engages the end of the fastener belt 190 and engages the entire belt 150 around the space 124 until the leading fastener and sleeve pass through the opening 152 in the muzzle bushing 54 and is properly positioned in the bore 98 therein ready to be driven by the piston member.

To fire the tool, the barrel assembly 50 is moved rearwardly until the end of the barrel member engages the cocking rod, as shown in FIG. 1. At this point, the forward end of the muzzle bushing 54 must be positioned against a suitable work surface to move the housing 2 formed relative to the barrel assembly 50. In so doing, the cocking rod 34 abuts the rearward end of the barrel member 52 so that the housing moves forward relative thereto. By virtue of the detent member 30 extending into the opening 40 of the cocking rod 34, the housing 2 also moves forwardly with respect to the firing pin 20 until the forward face of the breech block 16 abuts the rear surface of the barrel assembly 50. At this point, the detent member 30 of the firing pin 20 is in operable alignment with the sear portion 44 of the trigger member, so that by pulling the trigger member 42, the sear portion 44 will release the detent member 30 from the opening 40 in the cocking rod and the firing pin 20 will move forward under the action of its spring member 28 until the nose portion 22 thereof ejects through the frustoconical opening 18 in the breech block 16 and actuates the cartridge 58. The gases generated by the explosion of the cartridge 58 will drive the piston member 76 forwardly and drive the fastener into the work surface.

It can be seen from a comparison of FIGS. 1 and 9 that the tool can be cocked and fired by grasping the magazine assembly 100 and moving it rearwardly relatively to the housing 2. A flange 212 on the housing 2 limits rearward movement of the magazine assembly 100 to a point where it cannot move the cocking rod rearwardly. As seen in FIG. 9, when the magazine assembly 100 is in its rearwardmost position relative to the housing wherein it is in abutment with the flange 212 on the housing 2, the slot 128 in the muzzle bushing 54 has permitted limited rearward travel relative to the muzzle bushing so that the muzzle bushing 54 and barrel member 52 are not moved rearwardly to cock the firing mechanism 10. The muzzle bushing 54 still must be positioned against a suitable work surface and the housing 2 moved forwardly relative thereto to cock the firing assembly 10. This relative motion permitted by the slot 128 in combination with the stop means in the form of the flange 212 on the housing prohibits the possibility of air firing the tool by grasping the magazine assembly 100 to cock the tool. The spring member 132 ensures that the magazine assembly 100 is always in the forwardmost position relative to the muzzle bushing 54 when the tool is at rest so that the next fastener, after the piston has been returned by the combination of forward movement of the barrel assembly 50 relative to the housing 2 and piston return pawl 214, can be properly fed into the muzzle bushing ready for the next operation.

What is claimed is:

1. A belt for holding a plurality of fasteners of the type including a head portion, a shank portion, and a tapered tip portion, said belt including a plurality of fastener receiving sleeves interconnected by webs, each sleeve having an internal generally triangularly shaped cross sectional configuration, the fastener being engaged along a portion of its shank portion by each of the sides of said triangle.

2. A belt for holding a plurality of fasteners, said belt including a plurality of fastener receiving sleeves interconnected by webs, each sleeve having an internal triangularly shaped cross-sectional configuration with the corners of said triangle being cut off to form flat surfaces, a fastener being engaged by the sides of said triangle, the external surface of adjacent sleeves each having a planar portion above said web tapering away from said web and a portion below said web tapering away from said web.

3. The belt of claim 2 wherein one end of each said sleeves has a circular counter-bore therein and the other end has a groove extending parallel to the length of the belt, and said web has a V-shaped groove therein.

* * * * *

UNITED STATES PATENT OFFICE
CERTIFICATE OF CORRECTION

Patent No. 3,944,067                    Dated   March 16, 1976

Inventor(s)  Andrew G. Bakoledis

It is certified that error appears in the above-identified patent and that said Letters Patent are hereby corrected as shown below:

Col. 1, line 9, please insert a comma between "bolts" and "studs";

Col. 2, line 19, please delete "position" and insert --portion--;

Col. 4, line 60, please delete "bore" and insert --base--;

Col. 5, lines 10 and 11, please delete "and therefore, the follower member 118," which is repetitious;

Col. 5, line 57, please delete "oriented" and insert --oriented--;

Col. 6, line 28, please delete "150" and insert --190--;

Col. 6, line 38, please delete "formed" and insert --forward--;

Col. 6, line 59; after "can" please insert --not--.

Signed and Sealed this fifteenth Day of June 1976

[SEAL]

Attest:

RUTH C. MASON
Attesting Officer

C. MARSHALL DANN
Commissioner of Patents and Trademarks